United States Patent [19]
Dybro et al.

[11] Patent Number: 5,511,739
[45] Date of Patent: Apr. 30, 1996

[54] RETRACTOR HAVING A SINGLE SIDED ENERGY ABSORBING SPOOL

[75] Inventors: Niels Dybro, Utica; Harold J. Miller, III, Troy, both of Mich.

[73] Assignee: AlliedSignal Inc., Morristown, N.J.

[21] Appl. No.: 345,195

[22] Filed: Nov. 28, 1994

[51] Int. Cl.$^6$ .................................................. B60R 22/28
[52] U.S. Cl. ................................................ 242/379.1
[58] Field of Search ................... 242/379.1; 280/805, 280/806; 297/471, 472

[56] References Cited

U.S. PATENT DOCUMENTS

| | | | |
|---|---|---|---|
| 3,442,466 | 5/1969 | Fritsche | 242/379.1 |
| 3,790,099 | 2/1974 | Beller | 242/379.1 |
| 3,881,667 | 5/1975 | Tandetzke | 242/379.1 X |
| 3,927,846 | 12/1975 | Meissner | 242/379.1 |
| 3,952,967 | 4/1976 | Barile et al. | 242/379.1 |
| 3,961,761 | 6/1976 | Wiesbock | 242/379.1 |
| 4,158,403 | 6/1979 | Peter | 280/805 X |
| 4,323,205 | 4/1982 | Tsuge et al. | 242/379.1 |

FOREIGN PATENT DOCUMENTS 0228729  7/1987  European Pat. Off. .

Primary Examiner—John M. Jillions
Attorney, Agent, or Firm—Markell Seitzman

[57] ABSTRACT

An energy absorbing seat belt retractor comprising: a frame (22); a spool (24) rotatably mounted relatively to the spool including a lock wheel (71) having a plurality of lock teeth associated therewith and adapted to receive a seat belt thereabout; a lock pawl (77) for engaging the spool upon sensing a one of a vehicle deceleration and seat belt extraction above certain determinable levels; and movable nut (90) located in the spool and for prohibiting relative movement between the lock wheel and spool below a threshold input force level generated in part by occupant load on the seat belt and for generating a controlled energy dissipating reaction force on the seat belt after the input force exceeds the threshold level to permit a controlled rotation of the spool and the controlled pay out of the seat belt from the spool.

3 Claims, 3 Drawing Sheets

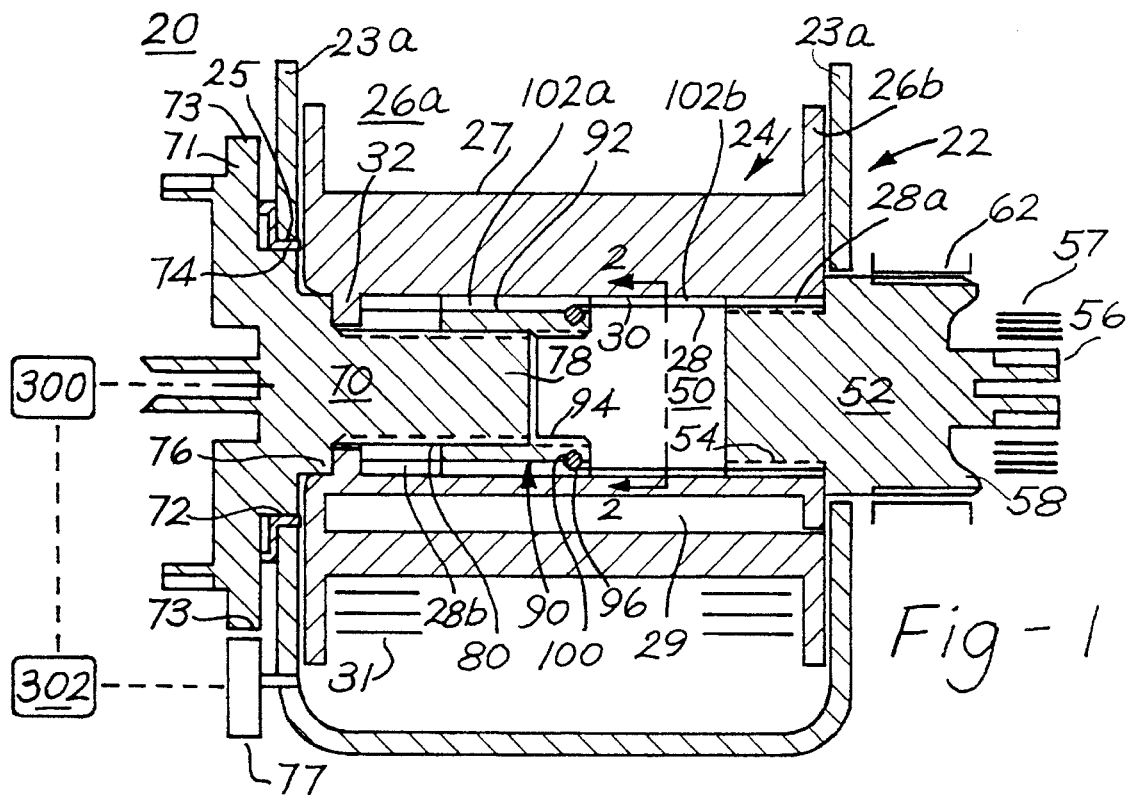
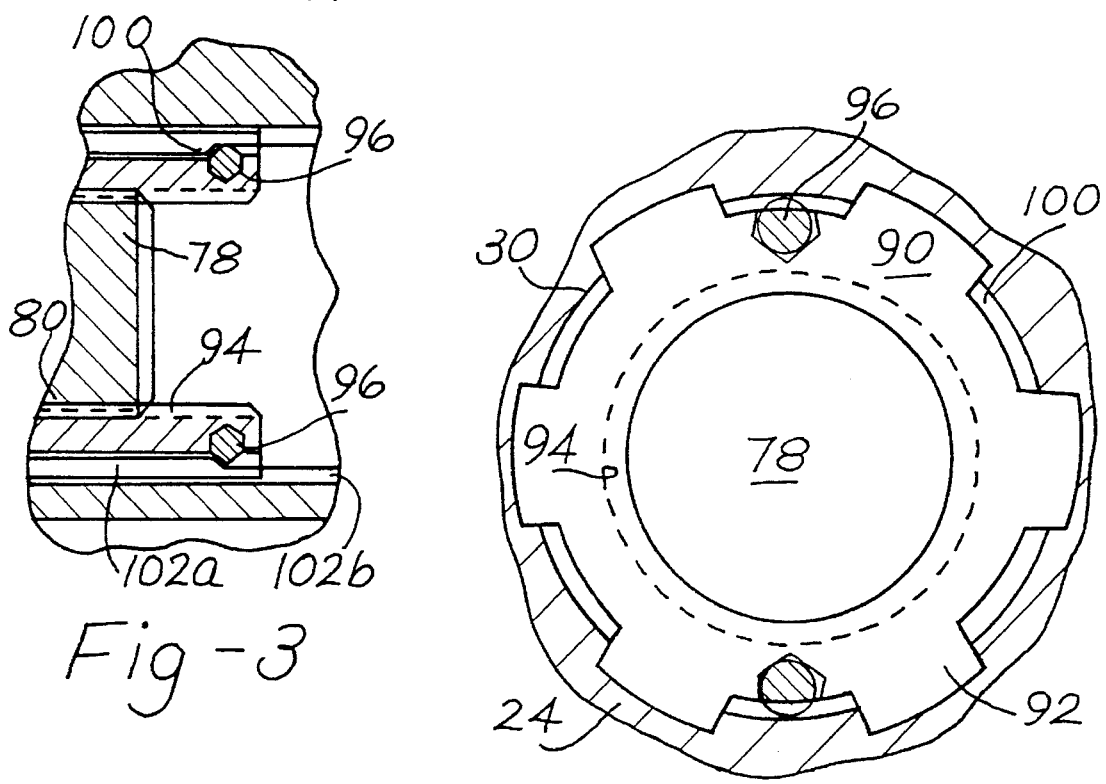
Fig-1
Fig-3
Fig-2

RETRACTOR HAVING A SINGLE SIDED ENERGY ABSORBING SPOOL

The present invention relates to vehicle safety restraint products and generally to a seat belt retractor having means for absorbing (dissipating) a certain amount of energy during a crash by deforming and/or crushing internal parts.

Safety belt restraint systems (or sub-systems) and air bag systems (or sub-systems) are designed to meet separate and distinct safety criteria and performance standards and then these separately designed systems are used together as a combined system to provide occupant protection during vehicle crashes and accidents. The performance of these systems, in terms of known, measurable occupant injury performance standards such as head injury criteria (HIC) and chest acceleration may not necessarily be equal to or less than the performance of either individual sub-system. It is believed that the degradation in performance, as manifested by increased occupant chest acceleration and related chest loading, is the result of an effective increased stiffness afforded by the seat belt system working in concert with the air bag system. These injury criteria and the potential for actual injury can be reduced by introducing into the seat belt safety system an energy absorbing or dissipating device which absorbs, i.e. dissipates, a certain amount of the energy produced in a vehicular crash or other emergency driving condition and in so doing lessens the amount of energy imparted to the occupant lessening the injury.

It is an object of the present invention to provide an improved occupant protection system and more specifically an energy absorbing retractor. The invention herein describes an apparatus for improving occupant injury performance to reduce the potential for injuries. A further object of the present invention is to provide for energy absorption or dissipation by providing a mechanism internal to the a retractor. The present invention comprises: an energy absorbing seat belt retractor comprising: a frame; a spool rotatably mounted relatively to the spool including a lock wheel having a plurality of lock teeth associated therewith and adapted to receive a seat belt thereabout. The retractor additionally includes first means for engaging the spool upon sensing if vehicle deceleration or the rate of seat belt extraction are above certain determinable levels; and second means locating within the spool joining the lock wheel to the spool and for prohibiting relative movement therebetween below a threshold input force level generated in part by occupant load on the seat belt and for generating a controlled energy dissipating reaction force on the seat belt after the input force exceeds the threshold level to permit a control rotation of the spool and the controlled protraction out of the seat belt from the spool. In the preferred embodiment of the invention the spool includes an axle assembly having fixed end portions and a movable nut interior thereto for dissipating or absorbing energy as it moves. In the context of the present invention energy dissipation and energy absorption are used interchangeably.

Many other objects and purposes of the invention will be clear from the following detailed description of the drawings.

BRIEF DESCRIPTION OF THE DRAWINGS

In the drawings:

FIG. 1 illustrates a cross sectional view showing many of the major components of the present invention.

FIG. 2 illustrates a isolated view of a spool along section line 2—2 of FIG. 1.

FIG. 3 shows an exploded view of a part of the retractor.

DETAILED DESCRIPTION OF THE DRAWINGS

Figure 13:
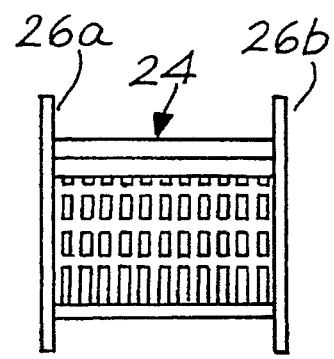
FIGS. 13 through 15 shows various views of a spool.
Figure 11:
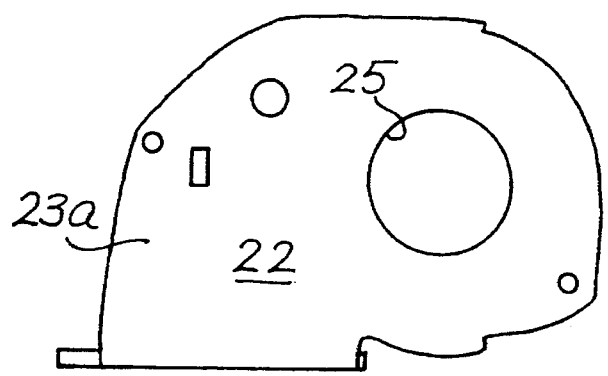
FIGS. 11 and 12 show side views of a retractor frame.
Figure 14:
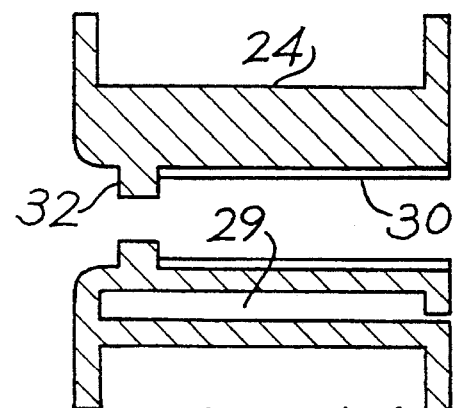
Figure 12:
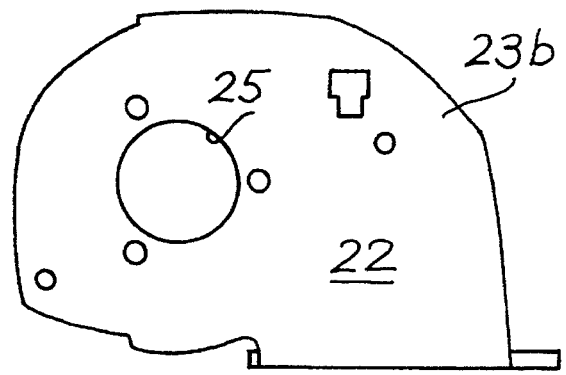
Figure 15:
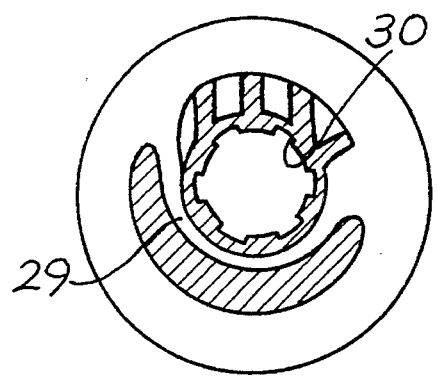

Reference is made to FIGS. 1–4. FIG. 1 illustrates a retractor 20 having a U-shaped frame 22 adapted to be connected to a part of a vehicle body or to a part of an occupant seat. Side views of the frame are shown in FIGS. 11 and 12. The frame includes frame sides 23a,b having a central opening 25 and a rear part 23c. The central opening may be of different diameter as shown or the same which will depend upon how the spool is supported. The retractor additionally includes a spool or reel 24 rotatably mounted to the frame 22. The spool 24 is shown in greater detail in FIGS. 13 through 15. The spool includes two (2) flanges 26a and 26b, a center part 27 about which seat belt webbing 31 is wound and a center bore 28 which includes a plurality of axially directed splines, slots or keys ways 30. The center part 27 includes a slot 29 which provides a means for connecting one end of a seat belt to the reel in a known manner. Situated at one end of the bore is an inwardly extending annular member 32, which functions as a thrust washer.

Partially situated within the bore 28, is an axle assembly 50 which includes a first member 52, at bore end 28a, and a second member 70 at bore end 28b. The first member 52 includes another plurality of splines 54 to provide a driving, rotational engagement with the reel or spool 24. The first member 52 includes a forked end 56 that forms a spring arbor and is adapted to receive a rewind spring 57, of known construction to retract the extended seat belt. An intermediate part 58 of the first member 52 provides an interface with a cooperating clutch 62 (a part of which is shown in phantom line). The clutch 62 may be a part of a pyrotechnic pretensioner (or belt tightener) mechanism which when activated causes the retractor to forcibly rewind to reduce unneeded slack in the belt (torso or lap) connected to the retractor 20. The operation of this type of pretensioner is known in the art and need not be discussed in any detail. As can be appreciated by one skilled in the art the rewind spring drives the spring arbor 58 to rewind webbing onto the spool. In a similar manner the spool may also be rewound under control of the pretensioner. As can be seen the clutch 62 supports the right hand end of the axle assembly 50 and provides a bearing surface upon which the intermediate portion 58 of the axle assembly 50 rotates. Support for the axle assembly can also be provided by adding a bushing between the frame and member 52 as is provided for the other side of the spool.

The second member 70 includes a shoulder 72 that is supported relative to the frame 22 by a bearing 74. The second member 70 additionally includes a second shoulder 76 that bears against the inwardly extending annular member 32. The second member includes a narrow portion 78 that extends further into the center of the bore 28. This member 78 includes a plurality of threads 80. A carrier member such as a threaded nut 90 interposes member 78 and the spool 24. The inside surface of the nut includes threads 94 which matingly engage threads 80 of member 78. This nut includes on its outer surface a plurality of splines 92 which permit the nut to move axially along the cooperating splines 30 of the spool 24 as it rotates on the threads 80. As can be appreciated the threads can be on the spool and the splines on member 78. The nut 90 further includes a metal deforming member or members such as one or more hardened (steel or synthetic) balls 96, that is the hardness of the balls is greater than the hardness of the splines of the spool. It should be appreciated that the splines of the spool can be made of one material and the spool of another. As an example the splines could be formed on an aluminum insert within a plastic or steel spool. Each ball 96 is received adjacent a ledge or shoulder 100 formed in the nut 90. Initially each ball resides adjacent the shoulder 100 formed between a wide 102a and narrow 102b portions of the splines 30. The shoulder may be sloped or perpendicular. The second member 70 also includes an integrally formed or joined lock wheel 71 having lock teeth 73 thereon engaged by a locking pawl 77 rotatably mounted to the frame 22 in a known manner.

Member 70 is adapted to respond to information derived from a vehicle sensor and a web sensor. These sensors respectively sense excessive vehicle deceleration and an excessive rate at which the seat belt webbing is protracted from the retractor 20. One such vehicle sensor 302 and web sensor 300 are diagrammatically shown in FIG. 1. European Patent Document EP 0 228 729 A1 is illustrative of a retractor having these types of sensors used to activate the lock pawl relative to a lock wheel. This document is incorporated herein by reference. When either of the vehicle or web sensor are activated they cause the locking pawl 77 to move into a mating engagement with the teeth 73 of the lock wheel 71.

Figure 4:
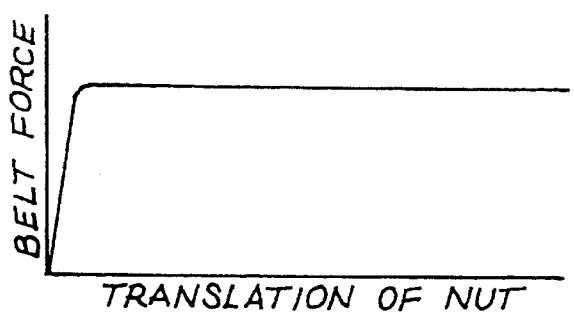
FIG. 4 shows a graph of belt force versus belt extraction.

During an accident the locking pawl 77 engages the teeth 73 of the lock wheel 71 thereby preventing the lock wheel, member 70 and spool 24 from rotating. Thereafter because of the dynamics created in a crash the occupant moves or tends to move forward (depending upon the amount of slack in the seat belt at that time) generating a substantial force upon the belt (the lap and/or shoulder belt) that is connected to the spool. This force is transmitted via the seat belt webbing wound about the center part 27 of the spool 24 creating a torque tending to rotate the spool, in a belt unwinding direction, about it's axis. The tendency of the spool to rotate is halted by the reaction forces generated at the interfaces between the nut 90 and the spool 24, the nut and the second member and the lock wheel 71 and the lock pawl 77. The loads (or torque's) imparted to the spool are transmitted directly to the threads 80 of the now locked second member 70 which tend to cause the nut 90 to try to rotate to the left about the threads 80 as viewed in FIG. 1 and simultaneously slide along the splines 30. This motion is initially halted by the presence of the balls 96 which are loaded against the shoulder 100. At some level of belt force the torsional forces developed at the thread 80/94 interface will be sufficient to cause the balls 96 to begin to deform the spool material at the shoulder 100 (i.e. the wider portion 102a of the splines). Once this force level is initiated the nut 90 will continue to rotate and slide along the splines as more material is deformed or extruded. The motion of the nut 90 provides for a post lock up rotational degree of freedom permitting the spool to also rotate in a belt unwinding direction controllably releasing or adding slack about the occupant. As can be appreciated as the spool rotates seat belt webbing is permitted to protract, under the pulling force exerted by the occupant on the seat belt. The pulling force is limited by the load carrying capability of the shaft assembly 50. If the amount of slack introduced into the seat belt is not controlled the occupant may be injured or at least be subjected to increased HIC and chest loading. The control of the occupant's motion is obtained by generating a substantially constant reaction force against the belt. Based on the description above, this reaction force is generated by the extruding or deforming of the spool material of the nut moves. As the material is deformed energy is absorbed or dissipated. Reference is briefly made to FIG. 4 which illustrates the effective reactive belt load (i.e. the load or force holding the occupant back) as a function of the translation of the nut. As can be seen this level is generally constant. This constant force level shown by numeral 99 and is approximately in the range of 400–700 lbs (1780–3,115 Newtons). However, the level of the reactive load generated can be in the range of 400 lbs. to 2000 lbs. (1780–8900 Newtons). As can be appreciated the level of reactive force generated internal to the retractor can be varied by changing the material used for the splines, the diameter of the reel, the amount of webbing on the reel, the number of balls and material used, etc.

Figure 5:
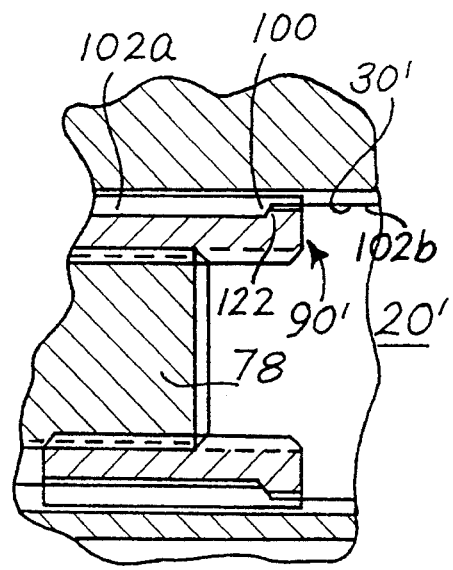
FIGS. 5 through 7 illustrate a second embodiment of the invention.
Figure 6:
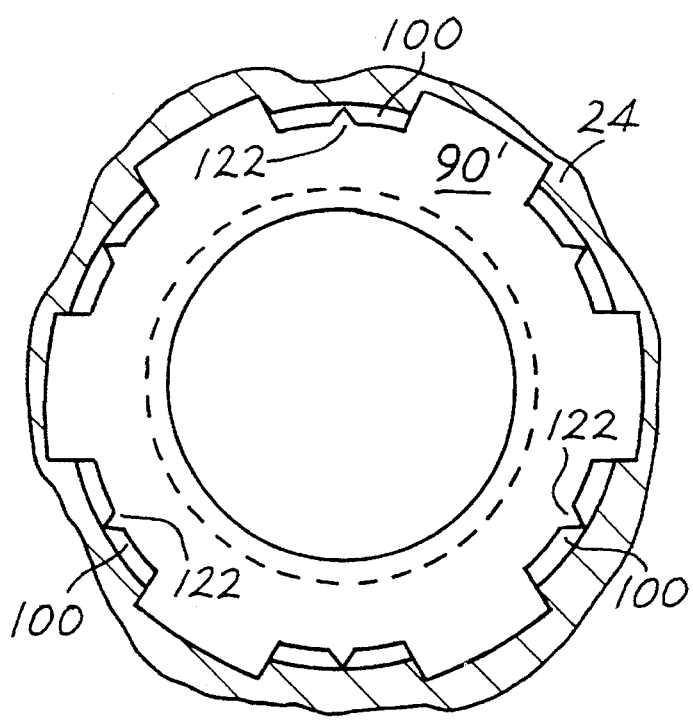
Figure 7:
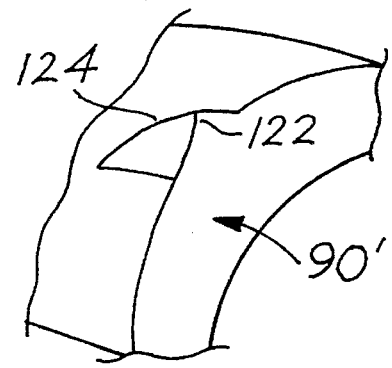

Reference is made to FIGS. 5 through 8 which illustrates an alternative embodiment of the present invention. FIG. 5 illustrates a partial cross-sectional view showing an alternative retractor 20'. The components of this retractor are identical to retractor 20 with the exception of the formation of the nut 90. The nut 90' does not use the balls 96 but instead incorporates one or more sharp edged metal cutting teeth 122. The general cross section of this tooth 122 is shown in FIG. 6. The tooth 122 includes a sloped cutting edge 124 that conforms to the shape of shoulder 100 as shown in FIG. 7.

Figure 8:
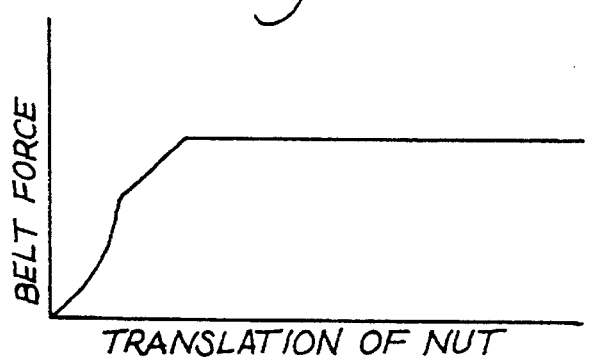
FIG. 8 shows another graph of belt load.

The operation of this second embodiment of the invention is identical to that described above with the exception that energy is dissipated not by deforming the wide section 102a of the spline 30 but by cutting the spline(s). As can be appreciated this cutting is provided by the edge 124 of the tooth as the nut 90' is forced along the splines 102a. FIG. 8 shows a graph of the reactive force or belt force that should be generated by this arrangement. As can be seen the onset of the reactive force is more gradual than that of FIG. 4.

Figure 9:
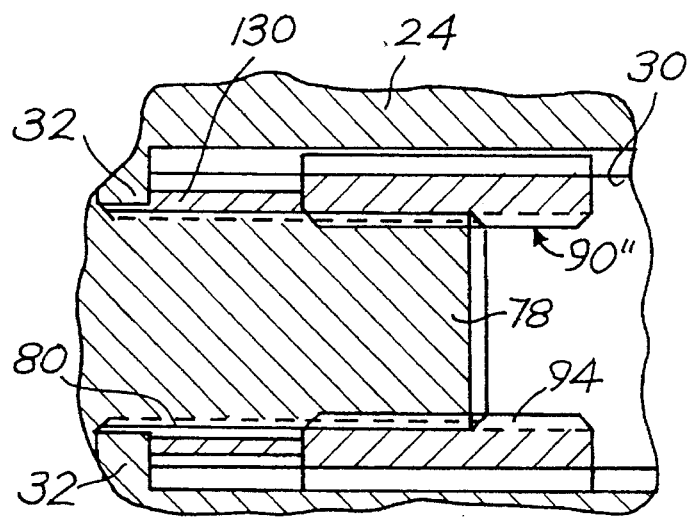
FIG. 9 shows another embodiment of the invention.

Reference is now made to FIG. 9 which illustrates a third embodiment of the present invention. In this embodiment the splines 30 formed within the bore 28 of spool 24 are of uniform height. The nut 90" includes constant height splines 92 and the internal threads 94 which matingly engage with the threads 80 formed on member 78. Situated between the nut 90" and the annular member 32 is a ring of deformable or crushable material 130 such as AL 606; 1010 Steel or brass or acetyl resin having a predetermined yield strength. This yield strength is chosen to provide the desired level (see FIG. 4) of energy dissipation. As an example of the desired level of energy absorption of about 600 lbs. The yield strength of the material would be approximately 28 Ksi. In operation, once the lock wheel is locked the sliding motion of the nut 90" against the ring 130 controllably crushes same.

Figure 10:
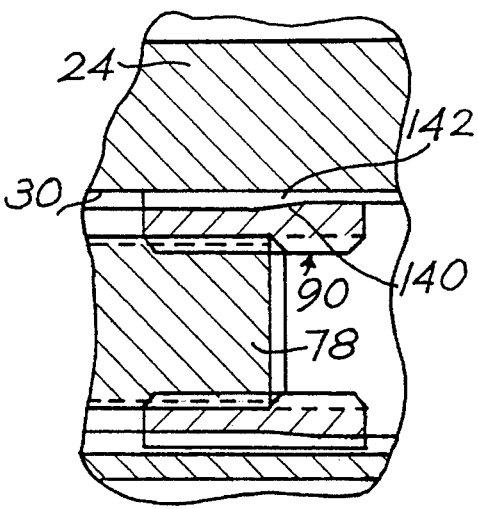
FIG. 10 shows still another embodiment of the invention.

Reference is made to FIG. 10 which a shows another embodiment of the invention in which the splines of nut 90 includes a conical engagement surface 140 initially fitted against a sloping shoulder 142 of the splines 30. As the nut is forcibly slid into the wider spline section this section is deformed dissipating or absorbing energy.

As can be seen from the embodiments of the invention a nut moves relative to a lock wheel to initiate a relatively constant energy dissipation or energy absorbing without any relative motion between the locking components of the retractor, that is, the locking pawl and the teeth formed on the lock wheel. Further, by utilizing only a single moveable member such as the nut in one part of an axle assembly and a fixed member such as member 52 in another part of the axle assembly allows the present invention to incorporate a retractor pretensioning mechanism used to temporarily reverse wind and tighten the webbing about the occupant during the initial moments of the crash. After the belt is suitably tightened slack is introduced in accordance with the present invention.

Many changes and modifications in the above described embodiment of the invention can, of course, be carried out without departing from the scope thereof. Accordingly, that scope is intended to be limited only by the scope of the appended claims.

We claim:

1. An energy absorbing seat belt retractor comprising:

a frame;

a spool rotatable mounted relatively to the frame for protracting and retracting a safety belt wound thereabout;

a lock wheel operatively coupled to the spool, including a plurality of lock teeth associated therewith;

first means for engaging the spool upon sensing one of a vehicle deceleration and seat belt extraction above certain determinable levels;

second means located within the spool joining the lock wheel to the spool for prohibiting relative movement therebetween below a threshold input force level generated in part by occupant load on the seat belt and for generating a controlled energy dissipating reaction force on the seat belt after the input force exceeds the threshold level to permit a controlled rotation of the spool and the controlled payout of the seat belt from the spool;

wherein the second means includes an axle assembly (50) including third means (90) movably disposed therein for dissipating energy as it moves by extruding adjacent material, the third means includes a carrier member, the carrier member comprising a splined and threaded nut translationally movable relative to one of the lock wheel and spool, the spool including a splined portion mating with the splines of the nut, and wherein at least one of the splines of the nut includes a conical engagement surface (140) butted against a mating sloping shoulder (142) formed on at least one of the spool splines.

2. An energy absorbing seat belt retractor comprising:

a frame;

a spool rotatably mounted relatively to the frame for protracting and retracting a safety belt wound thereabout, a lock wheel operatively coupled to the spool, including a plurality of lock teeth associated therewith;

first means for engaging the spool upon sensing a one of a vehicle deceleration and seat belt extraction above certain determinable levels;

second means located within the spool joining the lock wheel to the spool for probe biting relative movement therebetween below a threshold input force level generated in part by occupant load on the seat belt and for generating a controlled energy dissipating reaction force on the seat belt after the input force exceeds the threshold level to permit a controlled rotation of the spool and the controlled payout of the seat belt from the spool, the second means includes:

an axle assembly (50) including third means (90, 90', 90'') movably disposed therein for dissipating energy as it moves by extruding adjacent material, including a splined and threaded carrier translationally movable relative to one of the lock wheel and spool, wherein the carrier includes a plurality of hardened balls (96) proximate its periphery, movable against material of an inner bore of the spool to extrude such material as the balls move with the carrier.

3. An energy absorbing seat belt retractor comprising:

a frame;

a spool rotatably mounted relatively to the frame for protracting and retracting a safety belt wound thereabout, a lock wheel operatively coupled to the spool, including a plurality of lock teeth associated therewith;

first means for engaging the spool upon sensing a one of a vehicle deceleration and seat belt extraction above certain determinable levels;

second means located within the spool joining the lock wheel to the spool for prohibiting relative movement therebetween below a threshold input force level generated in part by occupant load on the seat belt and for generating a controlled energy dissipating reaction force on the seat belt after the input force exceeds the threshold level to permit a controlled rotation of the spool and the controlled payout of the seat belt from the spool, wherein the second means includes an axle assembly (50) including third means (90, 90', 90'') movably disposed therein for dissipating energy as it moves by cutting adjacent spool material internal to the spool, wherein the third means includes a splined and threaded carrier translationally movable relative to one of the lock wheel and spool, the carrier includes at least one cutting edge (124) proximate its periphery, movable against material of an inner bore of the spool to sever such material as the edge moves with the carrier.

* * * * *